(12) United States Patent
Achleitner et al.

(10) Patent No.: US 7,885,753 B2
(45) Date of Patent: Feb. 8, 2011

(54) METHOD AND DEVICE FOR OPERATING AN INTERNAL COMBUSTION ENGINE

(75) Inventors: Erwin Achleitner, Obertraubling (DE); Dirk Baranowski, Regensburg (DE); Carlos Eduardo Migueis, Tegernheim (DE); Paul Rodatz, Landshut (DE)

(73) Assignee: Continental Automotive GmbH, Hannover (DE)

( * ) Notice: Subject to any disclaimer, the term of this patent is extended or adjusted under 35 U.S.C. 154(b) by 182 days.

(21) Appl. No.: 12/298,406

(22) PCT Filed: Apr. 12, 2007

(86) PCT No.: PCT/EP2007/053553
§ 371 (c)(1),
(2), (4) Date: Oct. 24, 2008

(87) PCT Pub. No.: WO2007/125015
PCT Pub. Date: Nov. 8, 2007

(65) Prior Publication Data
US 2009/0070012 A1    Mar. 12, 2009

(30) Foreign Application Priority Data
Apr. 28, 2006   (DE) .................. 10 2006 019 894

(51) Int. Cl.
*F02D 41/40* (2006.01)
(52) U.S. Cl. ...................... 701/103; 123/679
(58) Field of Classification Search .............. 123/672, 123/480, 491, 494, 179.16, 676, 679; 701/103, 701/104
See application file for complete search history.

(56) References Cited

U.S. PATENT DOCUMENTS 4,947,818 A * 8/1990 Kamohara et al. .......... 123/691

(Continued)

FOREIGN PATENT DOCUMENTS

DE        197 00 711 A1     9/1998

(Continued)

OTHER PUBLICATIONS

Basshusen et al., Hand Verbrennungsmotor, Vieweg & Sohn Verlagsgesellschaft mbH, 2. edition, Braunschweig/Wiesbaden, Vieweg-Verlag, pp. 559-561, Jun. 2002.

*Primary Examiner*—John T Kwon
*Assistant Examiner*—Arnold Castro
(74) *Attorney, Agent, or Firm*—King & Spalding L.L.P.

(57) ABSTRACT

In a first operating state, the fuel metering of one of the cylinders is controlled in first metering pulses with the same pulse characteristic during a respective one working cycle, and the metering of fuel into the other cylinders by at least one second metering pulse with a different pulse characteristic. The first pulse number and characteristic is predefined such that the same fuel mass should be metered based on an assumed injection valve characteristic as with the one second metering pulse. Depending on the measurement signal, a correction value for the one cylinder is determined. To meter the fuel based on the assumed injection valve characteristic, a single first metering pulse would be generated during a respective one working cycle. The correction value for the one cylinder is used during the rest of the operation to adapt the first metering pulse in the second operating state.

5 Claims, 3 Drawing Sheets

U.S. PATENT DOCUMENTS

| | | | |
|---|---|---|---|
| 5,533,332 A * | 7/1996 | Uchikawa | 60/274 |
| 5,778,852 A * | 7/1998 | Penteker | 123/359 |
| 6,029,641 A * | 2/2000 | Suzuki et al. | 123/673 |
| 6,053,150 A * | 4/2000 | Takahashi et al. | 123/501 |
| 6,237,567 B1 * | 5/2001 | Nakano et al. | 123/446 |
| 6,450,158 B2 * | 9/2002 | Takahashi et al. | 123/681 |
| 6,516,773 B2 * | 2/2003 | Dutart et al. | 123/299 |
| 7,219,005 B2 * | 5/2007 | Mazet | 701/104 |
| 7,293,545 B2 * | 11/2007 | Dietl et al. | 123/299 |
| 7,305,299 B2 * | 12/2007 | Yasui et al. | 701/109 |
| 7,490,596 B2 * | 2/2009 | Yasui et al. | 123/697 |
| 7,536,244 B2 * | 5/2009 | Kunihiro et al. | 701/34 |
| 2004/0025857 A1 * | 2/2004 | Schnaibel et al. | 123/692 |

FOREIGN PATENT DOCUMENTS

| | | |
|---|---|---|
| DE | 102 06 906 C1 | 11/2003 |
| DE | 103 43 759 A1 | 4/2005 |
| DE | 10 2005 014 920 A1 | 4/2006 |
| DE | 10 2004 054 240 A1 | 5/2006 |
| DE | 10 2005 001 887 B3 | 7/2006 |
| FR | 2 857 700 A1 | 7/2003 |

* cited by examiner

FIG 1

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2007/053553 filed Apr. 12, 2007, which designates the United States of America, and claims priority to German Application No. 10 2006 019 894.8 filed Apr. 28, 2006, the contents of which are hereby incorporated by reference in their entirety.

TECHNICAL FIELD

The invention relates to a method and a device for operating an internal combustion engine with a number of cylinders.

BACKGROUND

Ever more stringent regulations regarding permissible pollutant emissions by motor vehicles fitted with internal combustion engines make it necessary to keep the pollutant emissions as low as possible during operation of the internal combustion engine. One of the ways in which this can be done is by reducing the emissions which occur during the combustion of the air/fuel mixture in the relevant cylinder of the internal combustion engine. Another is to use exhaust gas handling systems in internal combustion engines which convert the emissions which are generated during the combustion process of the air/fuel mixture in the relevant cylinder into harmless substances. Catalytic converters are used for this purpose which convert carbon monoxide, hydrocarbons and nitrous oxide into harmless substances. Both the explicit influencing of the generation of the pollutant emissions during the combustion and also the conversion of the pollutant components with a high level of efficiency by an exhaust gas catalytic converter require a very precisely set air/fuel ratio in the respective cylinder.

In particular it is also advantageous for the catalytic converter to be quickly ready for operation soon after the internal combustion engine has been started as regards avoiding pollutant emissions, since it is precisely in the first operating phase of the internal combustion engine that increased pollutant emissions are generated because the operating temperature of the internal combustion engine is still low. For this purpose, the practice is known of injecting fuel into the combustion chamber of the respective cylinder of the internal combustion engine such that this essentially passes into the exhaust gas tract uncombusted and oxidizes there, so that the thermal energy thus released leads to a rapid heating up of the catalytic converter and thereby to a rapid readiness for operation of the catalytic converter.

Linear closed-loop Lambda control with a linear Lambda probe which is arranged upstream from an exhaust gas catalytic converter and a binary Lambda probe which is arranged downstream of the exhaust gas catalytic converter is known from the German textbook, "Handbuch Verbrennungsmotor", published by Richard von Basshuysen, Fred Schäfer, 2nd edition, Vieweg & Sohn Verlagsgesellschaft mbH, June 2002, Pages 559-561. A Lambda setpoint value is filtered by means of a filter which takes account of gas delay times and the sensor behavior. The Lambda setpoint value filtered in this way is the guide value of a $PII^2D$ Lambda control, of which the manipulated variable is an injection amount correction.

SUMMARY

A simple method and a simple device for operating an internal combustion engine with a number of cylinders can be created.

According to an embodiment, a method for operating an internal combustion engine with a number of cylinders and an exhaust gas tract, in which an exhaust gas probe is arranged, of which the measuring signal is representative of an air/fuel ratio in the respective combustion chambers of the cylinders, may comprise the steps of: in a first operating state, controlling the metering of fuel in a number of first metering pulses with the same pulse characteristic during each working cycle in one of the cylinders and controlling in the remaining cylinders the metering of fuel by means of at least one second metering pulse of different pulse characteristic by comparison with the first metering pulse during each working cycle, wherein the number and pulse characteristic of the first metering pulses is predetermined on the basis of an assumed characteristic of the injection valve so that the same fuel mass would be metered as it would with at least one second metering pulse, and determining for a second operating state a correction value for the one cylinder as a function of the measuring signal of the exhaust gas probe wherein in the second operating state, to meter the fuel based on the assumed characteristic of the injection valve, a single first metering pulse would be created during each working cycle, wherein the correction value for the one cylinder being employed during further operation for adapting the first metering pulse in the second operating state.

According to a further embodiment, in the first operating state in a first test state the fuel may also be controlled by means of the at least one second metering pulse during each working cycle in the one cylinder and in a second test state the metering of fuel in a number of first metering pulses with same pulse characteristic is controlled during a working cycle in the one of the cylinders in each case and the correction value for the one cylinder may be determined as a function of the measuring signal of the exhaust gas probe in the first test state and in the second test state. According to a further embodiment, the correction value for adapting the first metering pulse in the second operating state in further operation may be adapted as a function of an operating temperature at the then current point in time and the assigned operating temperature when it was determined in the first operating state. According to a further embodiment, the correction value for adapting the first metering pulse in the second operating state in further operation may be adapted as a function of the current fuel pressure and the assigned fuel pressure when it was determined in the first operating state.

According to yet another embodiment, a device for operating an internal combustion engine may comprise a number of cylinders and an exhaust gas tract, in which an exhaust gas probe is arranged and generating a measuring signal which is representative of an air/fuel ratio in the respective combustion chambers of the cylinders, the device being operable, in a first operating state, to control the metering of fuel in a number of first metering pulses with the same pulse characteristic during each working cycle in one of the cylinders and in the remaining cylinders to control the metering of fuel by means of at least one second metering pulse of different pulse characteristic by comparison with the first metering pulse, wherein the number and pulse characteristic of the first metering pulse is predetermined on the basis of an assumed characteristic of the injection valve so that the same fuel mass would be metered as it would with at least one second metering pulse during each working cycle, with the device further being operable, depending on the measurement signal of the exhaust gas probe, to determine a correction value for the one cylinder for a second operating state, in which, to meter the fuel based on the assumed characteristic of the injection valve a single first metering pulse would be created during each working cycle, wherein the correction value for the one cylinder is employed during further operation for adapting the first metering pulse in the second operating state.

BRIEF DESCRIPTION OF THE DRAWINGS

Exemplary embodiments of the invention are explained in greater detail below with reference to the schematic drawings.

The figures are as follows.

Elements with identical construction or which function in the same way are identified by the same reference symbols in all figures.

DETAILED DESCRIPTION

According to various embodiments, in a method and a corresponding device for operating an internal combustion engine with a number of cylinders and an exhaust gas tract in which an exhaust gas probe is arranged of which the measuring signal is representative for an air-fuel ratio in the respective combustion chambers of the cylinder, in a first operating state the metering of fuel is controlled in a number of first metering pulses with the same pulse characteristic during one operating cycle in each case in one of the cylinders. As regards the remaining cylinders, in the first operating state the metering of fuel is controlled by means of at least one second metering pulse and said pulse has a different pulse characteristic by comparison with the first metering pulses and indeed during a working cycle of the remaining cylinders in each case.

Especially preferably the first operating state can be a state of low load, especially of the lower part load range or of idling, especially of idling at high revolutions.

The number and the pulse characteristic of the first metering pulses may be predetermined so that, based on an assumed characteristic of the injection valves, the same fuel mass is to be metered as with the at least one second metering pulse. Depending on the measuring signal of the exhaust gas probe a correction value is determined for the one cylinder and this is done for a second operating state, in which for metering the fuel based on the assumed characteristic of the injection valve, a single first metering pulse would be created during a working cycle in each case.

The correction value for the one cylinder is used during further operation for adapting the first metering pulse in the second operating state. In this way the smallest amounts of fuel in particular, represented by the first metering pulse, can be metered very precisely, especially also largely independent of production tolerances of the injection valves and largely independent of ageing influences of the injection valves.

Thus, use of the knowledge is made that the behavior of the respective injection valve in the first operating state in the case of the metering of fuel in a number of first metering pulses can be transferred to the metering of a small amount of fuel, represented by a single first injection pulse, and the correction value can thus be determined very precisely in the first operating state. This can be especially advantageous, since through a suitable at least one second metering pulse for metering of fuel into the remaining cylinders an extremely precise and thus very accurate actual metering of fuel into the remaining cylinders is possible and thus changes of the measuring signal are representative of errors during metering of fuel into the one cylinder.

In addition in the first operating state adaptation information relating to the at least one second metering pulse, obtained for example with the aid of a cylinder-individual Lambda control, can be used if necessary to design the desired metering of fuel by means of the at least one second metering pulse extremely precisely.

The pulse characteristic characterizes the respective metering pulse and can for example be its pulse width and/or pulse height and/or pulse rise and/or pulse fall.

In accordance with an embodiment, in the first operating state in a first test state the fuel is also controlled in the first cylinder by means of the at least one second metering pulse during a respective working cycle. Furthermore in a second test state the metering of fuel in a number of first metering pulses with the same pulse characteristic is controlled during each working cycle in the one of the cylinders. The correction value for the one of the cylinders is determined as a function of the measuring signal of the exhaust gas probe in the first test state and in the second test state. In this way the metering of the fuel by means of the number of first metering pulses by comparison with the metering of the desired amount of fuel by means of the at least one metering pulse related to the one cylinder can be especially precisely detected and there can thus be an especially precise determination of the correction value.

In accordance with a further embodiment, the correction value for adapting the first metering pulse in the second operating state is adapted during further operation as a function of an operating temperature at the then current point in time and adapted to the assigned operating temperature when it was determined in the first operating state. A fuel temperature or also a coolant temperature have proven to be especially suitable operating temperatures for this purpose. In this way an especially precise metering of the fuel in the second operating state can be undertaken.

In accordance with a further embodiment, the correction value for adapting the first metering pulse in the second operating state in further operation is adapted depending on a fuel pressure at the then current point in time and on the assigned fuel pressure when it was determined in the first operating state. In this way the influence of the fuel pressure which has proved to be entirely relevant can be taken into consideration especially well. Above and beyond this the fuel pressure on determination of the correction value in the first operating state differs greatly form the pressure during adaptation of the first metering pulse in the second operating state and can thus be taken into consideration, especially through interpolation or extrapolation.

An internal combustion engine (FIG. 1) comprises an induction tract 1, an engine block 2, a cylinder head 3 and an exhaust gas tract 4. The induction tract 1 preferably comprises a throttle valve 5, also a collector 6 and an induction pipe 7 which is routed through to the cylinder Z1 via an inlet channel in the engine block 2. The engine block 2 further comprises a crankshaft 8, which is coupled via a connecting rod 10 to the piston 11 of the cylinder Z1.

Figure 1:
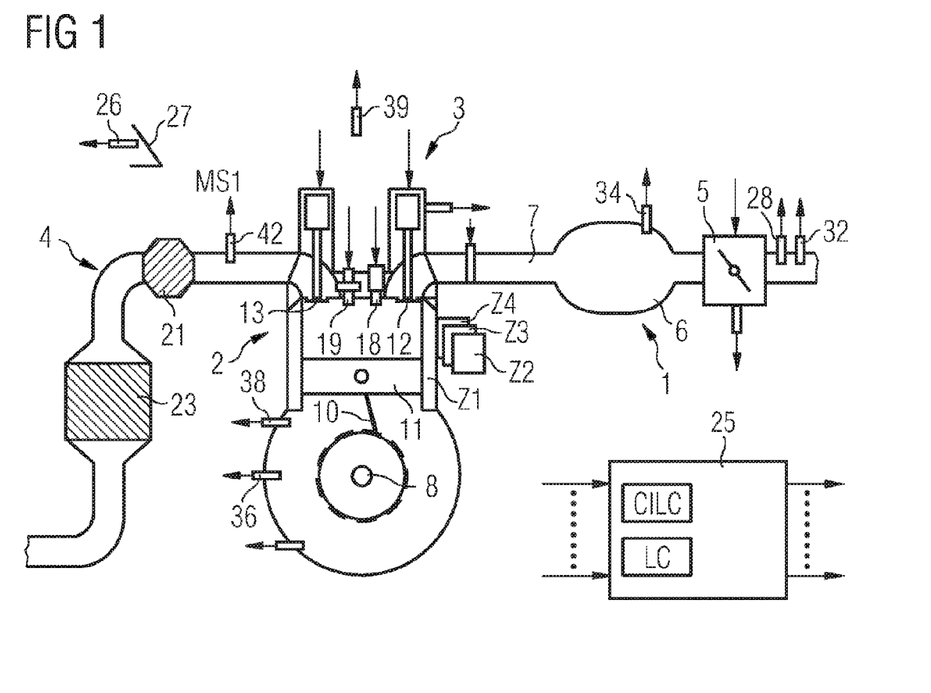
FIG. 1 an internal combustion engine with a control device.

The cylinder head 3 includes valve gear with a gas inlet valve 12 and a gas exhaust valve 13.

The cylinder head 3 further comprises an injection valve 18 and a spark plug 19. Alternatively the injection valve 18 can also be arranged in the inlet manifold 7.

An exhaust gas catalytic converter 21 which is preferably embodied as a three-way catalytic converter is arranged in the exhaust gas tract. A further exhaust gas catalytic converter is also arranged in the exhaust gas tract, which is embodied as an NOx exhaust gas catalytic converter.

A control device 25 is provided to which sensors are assigned which detect different measurement variables and determine the value of the measurement variable in each case. Operating variables, as well as measurement variables, also include variables derived from these. The control device 25 determines, as a function of at least one of the operating variables, control variables which are then converted into one or more control signals for controlling the actuation elements by means of corresponding actuators. The control device 25 can also be referred to as the device for operating the internal combustion engine.

The sensors are a pedal position sensor 26, which records a position of the gas pedal 27, an air mass sensor 28, which records an air mass flow downstream of the throttle valve 5, a first temperature sensor 32, which records an induction air temperature, an induction manifold pressure sensor 48, which records an induction manifold pressure in the collector 6, a crankshaft angle sensor 36 which records a crankshaft angle which is then assigned to a speed.

Furthermore a second temperature sensor 38 is provided which detects an operating temperature BT, especially a coolant temperature or a fuel temperature. in addition a pressure sensor 39 is provided, which detects a fuel pressure, especially in a high-pressure accumulator of a fuel feed. Furthermore an exhaust gas probe 42 is provided which is arranged upstream or in the catalytic converter 42 and detects the residual oxygen level of the exhaust gas and of which the measuring signal MS1 is characteristic for the air/fuel ratio in the combustion chamber of the cylinder Z1 and upstream of the first exhaust gas probe before the oxidation of the fuel, referred to below as the air/fuel ratio in the cylinders Z1-Z4.

The exhaust gas probe 42 is preferably a linear Lambda probe, but it can basically also be a binary Lambda probe.

Depending on the embodiment, any subset of said sensors can be present or additional sensors can also be present.

The adjusting elements are for example the throttle valve 5, the gas inlet and gas outlet valves 12, 13, the injection valve 18 or the spark plug 19.

As well as the cylinder Z1, further cylinders Z2 to Z4 are also provided to which corresponding actuating elements and where necessary sensors are also assigned. The internal combustion engine can thus have any number of cylinders.

Basically the internal combustion engine can also have a number of cylinder banks, for example two cylinder banks, to each of which a separate first exhaust gas probe 42 is assigned. In this case the following information applies, related to the respective cylinder bank in each case.

Preferably a cylinder-individual Lambda control CILC and a Lambda control LC are provided in the control device 25. The Lambda control LC includes the specification of a raw air/fuel ratio which as a rule is close to or the same as the stochiometric air/fuel ratio. Modulated onto the specified raw air/fuel ratio is a forced excitation in the form of a square-wave signal. This then forms the control variable of the Lambda control LC. The Lambda control is then supplied with the difference between a detected air/fuel ratio and the control variable determined as a function of the measuring signal MS1 of the exhaust gas probe 42. The Lambda control is regularly embodied as a PII$^2$D control. The corrective signal of the Lambda control is a Lambda control factor, by means of which a fuel mass to be metered to the combustion chambers of the cylinders Z1 to Z4 is corrected. One Lambda control is assigned in each case to each cylinder bank of the internal combustion engine, which are each assigned a separate exhaust gas sensor 42. A correction of the amount of injected fuel to be metered and thus of the corresponding actuation signal for the injection valve 18 relative to all cylinders assigned to it is thus undertaken by means of Lambda control.

For correction of cylinder-individual deviations of the air/fuel ratio a cylinder-individual Lambda control CILC is provided for each cylinder Z1 to Z4.

Within the framework of the cylinder-individual Lambda control CILC the measuring signal MS1 of the exhaust gas probe 42 is sampled and the sampled measuring signal is individually assigned within a predeterminable measurement window to the respective cylinders Z1 to Z4 and thus a detected cylinder-individual air/fuel ratio is determined. A difference between a mean value of a mean cylinder-individual air/fuel ratio and the respective cylinder-individual air/fuel ratio is formed as a control difference. The controller of the cylinder-individual Lambda control CILC preferably includes an I$^2$ component.

As an actuation signal it creates a cylinder-individual Lambda control factor, which is used for cylinder-individual correction of the fuel mass to be metered in the respective cylinder and which thus leads to an adaptation of the respective corrective signal. Preferably an adaptation is undertaken at predetermined intervals or also if predetermined operating conditions obtain, by a predeterminable proportion of the corrective signal of the Lambda control being transferred in a predetermined manner to an adaptation value. In this way, if necessary even with a deactivated cylinder-individual Lambda control CILC, use can be made of the information obtained during the cylinder-individual Lambda control CILC.

It is important for an activated state of the cylinder-individual Lambda control that through a suitable sampling of the measuring signal MS1 of the exhaust gas probe 42 a direct assignment to the respective air/fuel ratio in the respective cylinder Z1 to Z4 can take place with the basically the same metering of fuel to all cylinders. This can only be reliably guaranteed however in operating states as from a lower part load up to higher loads. This is caused by the fact that a strong eddying of the exhaust gas packages to be assigned to the respective cylinders occurs because of the small air throughflow and thus a cylinder-individual assignment is no longer possible. Thus the cylinder-individual Lambda control can only be used in a restricted way, especially in operating states with very small injection amounts, i.e. for example in an idling mode with very restricted load. However trials have shown that adaptations which depend on the cylinder-individual Lambda control factor CILC in the lower load range of their use are transmitted into the load range of the lower part load or of idling. This means that the information obtained by the cylinder-individual Lambda control in these operating ranges of the internal combustion engine can be used for precise metering of the desired fuel amount.

Various programs are stored in a memory of the control device 25 which are run in the control device during the operation of the internal combustion engine.

Figure 2:
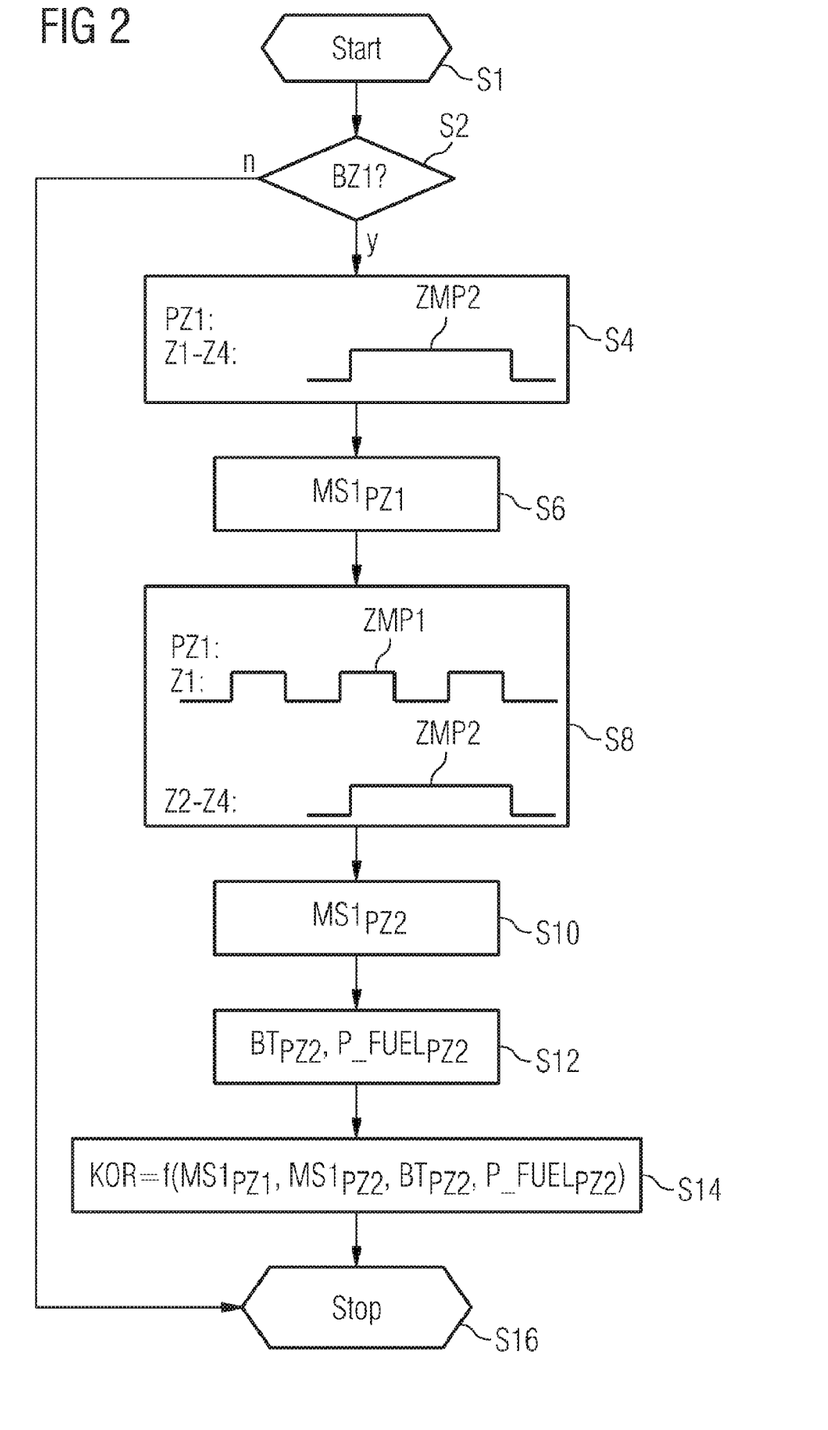
FIG. 2 a first flowchart of a program executed in the control device.

A first program is started in a step S1 (FIG. 2). In step S1 variables can be initialized. The program can be started in step S1 at regular intervals during operation or if predeterminable conditions are fulfilled during the operation of the internal combustion engine.

In a step S2 a check is made as to whether a first operating state BZ1 obtains. The first operating state can for example be a lower part load mode of the internal combustion engine or also an idling mode. It is preferably characterized in that, for each working cycle in the respective cylinder Z1 to Z4 an integer multiple of a smallest amount of fuel is to be metered, with the multiples preferably being twice or three times the smallest amount. In addition the amount of fuel to be metered per working cycle into the respective cylinder Z1 to Z4 can also be a larger integer multiple. The smallest amount of fuel can for example lie in the range of an amount of fuel to be metered within the framework of a post-injection of fuel, which can be used to heat up a catalytic converter. It can however also for example, especially with diesel internal combustion engines, lie in the range of an amount of fuel to be injected within the framework of a pre-injection. For example the smallest amount can thus amount to around 2 to 3 mg. This means that then for example the first operating state BZ1 can be characterized in that, for each cylinder Z1 to Z4 per operating cycle an amount of fuel of 6 to 9 mg is to be metered.

If the condition of step S2 is not fulfilled, the program is preferably ended in a step S16. If however the condition of step S2 is fulfilled, then, preferably in a step S4, a first test state PZ1 is assumed. In the first test state PZ1 the metering of the fuel into the cylinders Z1 to Z4 is controlled by means of at least of one second metering pulse ZMP2 during each respective working cycle. The second metering pulse ZMP2 thus represents the actuation signal SG for the respective injection valve 19 of the respective cylinder Z1 to Z4 and takes account of the information obtained within the framework of the cylinder-individual Lambda control CILC, even if this is not to be activated in the first operating state BZ1. A very precise metering of the desired amount of fuel can thus be guaranteed.

The metering of the fuel mass to be injected in each working cycle into the respective combustion chamber of the respective cylinder Z1 to Z4 in the first test state PZ1 is preferably undertaken by means of a single second metering pulse per cylinder Z1 to Z4. There can however be two second metering pulses ZMP2 for example.

In a step S6 the assigned first measuring signal $MS1_{PZ1}$ of the exhaust gas probe 42 is detected and buffered. At regular intervals the measuring signal $MS1_{PZ1}$ detected in step S6 for the first test state PZ1 is representative of the essentially stochiometric air/fuel ratio.

In a step S8 a second test state PZ2 is assumed. In the second test state PZ2 the metering of fuel in relation to a cylinder, using the cylinder Z1 below as an example, is controlled in a number of first metering pulses ZMP1 with the same pulse characteristic during one working cycle in each case. In the remaining cylinders Z2 to Z4 the fuel continues to be metered by means of the at least one second metering pulse ZMP2.

The second metering pulse ZMP2 has a different pulse characteristic by comparison with the first metering pulse ZMP1. The number and the pulse characteristic of the first metering pulses ZMP1 is predetermined so that, on the basis of a characteristic of the injection valve 18 assumed, the same fuel mass is to have been metered into the one cylinder Z1 as with the at least one second metering pulse ZMP2 in the remaining cylinders Z2 to Z4. Preferably the pulse characteristic of the metering pulse is determined as a function of an engine map, in which as well as the mass fuel flow MFF to be metered, further operating variables of the internal combustion engine can be taken into account, such as for example a current operating temperature or also a current fuel pressure $P\_FUEL_{AKT}$. Above and beyond this, information is preferably used in this context which is present as a function of the cylinder-individual Lambda control factor, such as adaptation values for example.

In a step S10 the first measuring signal is then detected in relation to the second test state PZ2 and also buffered. Deviations of the measuring signal $MS1_{PZ2}$ in the second test state from the measuring signal $MS1_{PZ1}$ in the first test state are thus characteristic of deviations of the measured fuel mass in the cylinder Z1 actually measured in the second test state PZ2 by comparison with the fuel mass actually measured in the first test state PZ1 in the cylinder Z1. These can be caused by the fact that, with the first metering pulse ZMP1, relative disruptive influences, for example ageing of the injection valve 18 or production variations, have a greater effect than with the two metering pulses ZMP2, for which a greater fuel amount is metered per metering pulse.

Furthermore in a step S12 an operating temperature $BT_{PZ2}$ is detected in the second test state and/or a fuel pressure $P\_FUEL_{PZ2}$ in the second operating state. Alternatively the step S12 can be executed in precisely this manner in the first test state PZ1. Above and beyond this the condition of step S2 can also include the operating temperature and/or the fuel pressure lying in a predetermined range or in one of a number of predetermined ranges.

In a step S14 a correction value KOR for the one cylinder Z1 is then determined and this is done for a second operating state BZ2, in which, for metering the fuel based on the assumed characteristic of the injection valve 18, a single first metering pulse ZMP2 would be created during one working cycle in each case based on the fuel mass to be metered without taking the correction value onto account. The important factor in this connection is that in the second operating state BZ2 a fuel mass to be assigned to the first metering pulse ZMP1 based on the assumed characteristic of the injection valve 18 is to be precisely metered. However this does not exclude the fact that further fuel masses will also be metered in the second operating state BZ2.

The second operating state BZ2 can for example be assumed as part of a catalytic converter heating close to the time when the internal combustion engine is started, in which a smallest amount of fuel is injected into the cylinders Z1-Z4 of the internal combustion engine such that is passes essentially in the unoxidized state into the exhaust gas tract 4 and leads to an exothermic reaction there, which contributes to a rapid heating up of the catalytic converter 21.

Above and beyond this in the second operating state BZ2 a smallest amount can also be metered as part of a pre-injection into the respective cylinders Z1 to Z4, as can be the case for example with diesel internal combustion engines or also within the new combustion processes occurring in gasoline internal combustion engines such as whole space ignition.

In step S14 the correction value is then determined as a function of the measuring signal $MS1_{PZ1}$ in the first test state, the measuring signal $MS1_{PZ2}$ in the second test state PZ2 and the operating temperature $BT_{PZ2}$ and the fuel pressure $P\_FUEL_{PZ2}$ in the second test state and thus is done such that, by a correction of the pulse characteristic of the first metering pulse ZMP1 the desired fuel mass being metered into the one cylinder Z1 as part of the required accuracy. In this context the correction value KOR is preferably assigned to the corresponding fuel mass MFF and also to the operating temperature BT or also to the fuel pressure P_FUEL. This can for example be done by it being stored in a corresponding engine map.

In step S16 the program is subsequently ended. Preferably the program is executed a number of times during the operation of the internal combustion engine, in order to have the corresponding correction values KOR available for as many different mass fuel flows as possible to be metered in the second operating state BZ2.

Over and above the corresponding appropriate programs are also executed for determination of corresponding correction values for the cylinders Z2 to Z4. The number of the first metering pulses ZMP1 preferably amounts to two to three times the number of the second metering pulses ZMP2 pro working cycle of the respective cylinder. Basically it can also be a larger multiple thereof, if this still allows a sufficiently precise determination of the correction value KOR to be guaranteed. It is important in this connection for the number of cylinders Z1-Z4 which must be taken into account overall within the framework of the execution of the program in accordance with FIG. 2 to have a sufficiently small number, so that the change info the air/fuel ratio triggered by the number of first metering pulses ZMP1 in the one cylinder Z1 also acts detectably on the measuring signal MS1 of the exhaust gas probe 42. Especially advantageous here for example is the use of the program within the context of an internal combustion engine with a total of six cylinders, which is subdivided into three cylinders per cylinder bank in each case and to each of which a separate exhaust gas probe 42 is assigned, with the result that the program depicted in FIG. 2 will be executed separately for each of the cylinder banks.

It should be noted in this context that the changes in the air/fuel ratio in the one cylinder Z1 then lead to detectable changes of the measuring signal MS1 of the exhaust gas probe 42 if they lie within the required accuracy range of metering of the fuel or beyond this in relation to the mass fuel flows assigned to the first metering pulses ZMP1. With the smallest amounts of fuel this requirement for accuracy can amount to around 10 for example.

Over and above this it is advantageous for the air mass flowing into the respective cylinders Z1-Z4 to be able to be set as precisely as possible since it too influences the air/fuel ratio.

In step S16 the program is subsequently ended.

Figure 3:
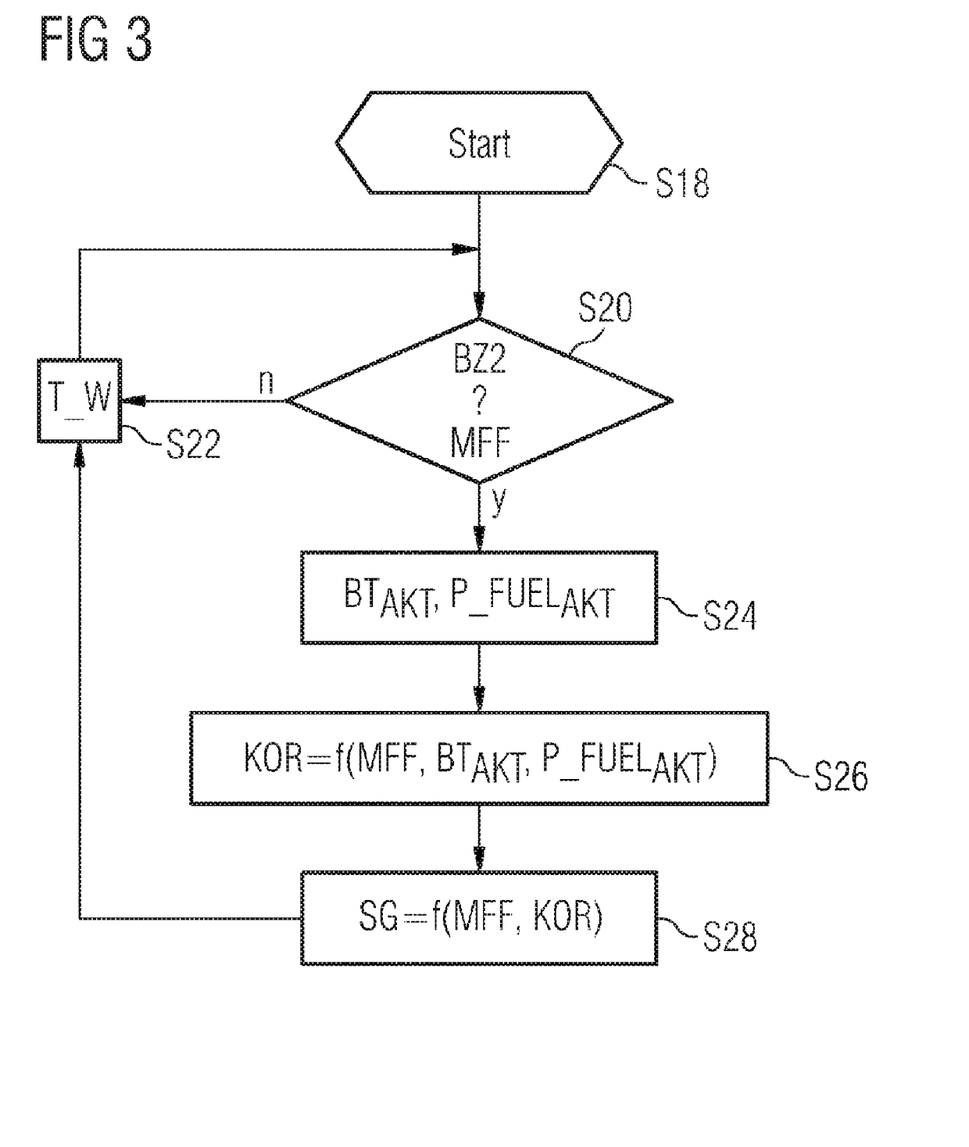
FIG. 3 a further flowchart of a further program executed in the control device.

A further program is executed during of the operation of the internal combustion engine, which will be explained in more detail below with reference to the flowchart depicted in FIG. 3. It is started in a step S18 which for example can lie close to the time at which the internal combustion engine is started. In the step S18 variables are preferably initialized.

In a step S20 a check is performed as to whether the second operating state BZ2 is present. If it is, then by means of a further function the mass fuel flow MFF to be metered is determined, with this not necessarily having to be the mass fuel flow to be metered over the working cycle of the respective cylinders Z1 to Z4, but preferably for example the mass fuel flow MFF needed for post-injection within the framework of the catalytic converter heating or also the mass fuel flow needed for carrying out a pre-injection.

If the condition of the step S20 is not fulfilled, processing is continued in a step S22 in which the program preferably pauses for a predeterminable waiting time T_W before the processing is continued once again in the step S20. The predetermined waiting time can for example also be dependent on the speed of the internal combustion engine.

If on the other hand the conditions of the step S20 are fulfilled, in a step S24 the current operating temperature $BT_{AKT}$ and/or the current fuel pressure $P\_FUEL_{AKT}$, are determined.

In a step S26 a corresponding assigned correction value KOR, depending on the mass fuel flow MFF, the current operating temperature $BT_{AKT}$ and/or the current fuel pressure $P\_FUEL_{AKT}$ is determined for the respective cylinders Z1 to Z4. In this context the correction value KOR determined when the step S14 was executed is used.

In a step S28 the respective corrective signal SG for the respective injection valve 18 of the respective cylinder Z1 to Z4 as a function of the mass fuel flow MFF to be metered and the correction value KOR are then determined and thus a corresponding adapted first metering pulse ZMP1 created. Subsequently processing is continued at step S22.

Alternatively the steps S4 and S6 can also be omitted and consequently the determining of the correction value KOR can also then be undertaken in the step S14 independently of the measuring signal $MS1_{PZ1}$ of the exhaust gas probe 42 in the first test state.

The invention claimed is:

1. A method for operating an internal combustion engine with a number of cylinders and an exhaust gas tract, in which an exhaust gas probe is arranged, of which the measuring signal is representative of an air/fuel ratio in the respective combustion chambers of the cylinders, the method comprising the steps of:
   in a first operating state:
      during each working cycle, controlling the metering of fuel in one of the cylinders using a number of first metering pulses having the same pulse characteristic, and
      during each working cycle, controlling the metering of fuel in each of the remaining cylinders using one or more second metering pulse having a different pulse characteristic than the first metering pulse,
      wherein the number and pulse characteristic of the first metering pulses is predetermined such that based on an assumed characteristic of the injection valve, the same fuel mass would be metered with the number and pulse characteristic of the first metering pulses as would be metered with the one or more second metering pulse,
      detecting a measuring signal of the exhaust gas probe during the first operating state,
   determining for a second operating state a correction value for the metering of fuel in the one cylinder as a function of at least the measuring signal of the exhaust gas probe detected during the first operating state, and
   during the second operating state, adapting the determined correction value based at least on:
      an operating temperature detected at the then current time and on an operating temperature detected when the correction value was determined in the first operating state, and
      a fuel pressure detected at the then current time and on a fuel pressure detected when the correction value was determined in the first operating state.

2. The method according to claim 1, wherein:
   the first operating state includes a first test state and a second test state,
   in the first test state the metering of fuel in the one cylinder during each working cycle is controlled using the one or more second metering pulse, and in a second test state the metering of fuel in the one cylinder during each working cycle is controlled using the number of first metering pulses having the same pulse characteristic, the measuring signal of the exhaust gas probe is detected during the first test state and again during the second test state, wherein the correction value for the metering of fuel in the one cylinder is determined as a function of a comparison between the measuring signal of the exhaust gas probe detected during the first test state and the measuring signal of the exhaust gas probe detected during the second test state.

3. A device for operating an internal combustion engine comprising a number of cylinders and an exhaust gas tract, in which an exhaust gas probe is arranged and generating a measuring signal which is representative of an air/fuel ratio in the respective combustion chambers of the cylinders, wherein:

the device is operable, in a first operating state, to:

control the metering of fuel in one of the cylinders using a number of first metering pulses having the same pulse characteristic, and control the metering of fuel in each of the remaining cylinders using one or more second metering pulse having a different pulse characteristic than the first metering pulse, wherein the number and pulse characteristic of the first metering pulse is predetermined such that based on an assumed characteristic of the injection valve, the same fuel mass would be metered with the number and pulse characteristic of the first metering pulses as would be metered with the one or more second metering pulse during each working cycle, the device is further operable, based at least on a measurement signal of the exhaust gas probe taken during the first operating state, to determine a correction value for the metering of fuel in the one cylinder for a second operating state, and the device is further operable, during the second operating state, to adapt the determined correction value based at least on an operating temperature detected at the then current time and on an operating temperature detected when the correction value was determined in the first operating state.

4. The device according to claim 3, wherein:

the first operating state includes a first test state and a second test state, and the device is further operable, in the first test state, to control the metering of fuel in the one cylinder during each working cycle using the one or more second metering pulse, the device is further operable, in the second test state to control the metering of fuel in the one cylinder during each working cycle using the number of first metering pulses having the same pulse characteristic, and the device is further operable to determine the correction value for the metering of fuel in the one cylinder as a function of a comparison between a measuring signal of the exhaust gas probe detected during the first test state and a measuring signal of the exhaust gas probe detected during the second test state.

5. The device according to claim 3, wherein the device is further operable to adapt the determined correction value as a function of at least (a) the operating temperature detected at the then current time and the operating temperature detected when the correction value was determined in the first operating state, and (b) a fuel pressure detected at the then current time and a fuel pressure detected when the correction value was determined in the first operating state.

* * * * *